United States Patent
Conti

(10) Patent No.: US 11,130,384 B2
(45) Date of Patent: Sep. 28, 2021

(54) HEATING AND COOLING SYSTEM FOR AN ELECTRIC VEHICLE

(71) Applicant: WILLIAMS ADVANCED ENGINEERING LIMITED, Wantage (GB)

(72) Inventor: Davide Conti, Wantage (GB)

(73) Assignee: WILLIAMS ADVANCED ENGINEERING LIMITED, Oxfordshire (GB)

(*) Notice: Subject to any disclaimer, the term of this patent is extended or adjusted under 35 U.S.C. 154(b) by 30 days.

(21) Appl. No.: 16/346,449

(22) PCT Filed: Oct. 27, 2017

(86) PCT No.: PCT/GB2017/053239
§ 371 (c)(1),
(2) Date: Apr. 30, 2019

(87) PCT Pub. No.: WO2018/078379
PCT Pub. Date: May 3, 2018

(65) Prior Publication Data
US 2019/0299738 A1    Oct. 3, 2019

(30) Foreign Application Priority Data

Oct. 31, 2016 (GB) .................................. 1618385

(51) Int. Cl.
| | |
|---|---|
| *B60H 1/00* | (2006.01) |
| *B60H 1/32* | (2006.01) |
| *B60H 1/14* | (2006.01) |

(52) U.S. Cl.
CPC ..... *B60H 1/00392* (2013.01); *B60H 1/00278* (2013.01); *B60H 1/143* (2013.01);
(Continued)

(58) Field of Classification Search
CPC ............ B60H 1/00392; B60H 1/32281; B60H 1/00278; B60H 1/143; B60H 1/323; B60H 2001/00307; B60L 2270/46
(Continued)

(56) References Cited

U.S. PATENT DOCUMENTS

| | | | |
|---|---|---|---|
| 7,789,176 B2* | 9/2010 | Zhou .................. | B60H 1/32281 180/65.1 |
| 8,753,762 B2* | 6/2014 | Major ................. | H01M 10/625 429/120 |

(Continued)

FOREIGN PATENT DOCUMENTS

| | | |
|---|---|---|
| JP | 2006-264430 A | 10/2006 |
| JP | 2012-035812 A | 2/2012 |

(Continued)

OTHER PUBLICATIONS

International Search Report and Written Opinion in corresponding PCT/GB2017/053239, dated Jan. 30, 2018.

(Continued)

*Primary Examiner* — Claire E Rojohn, III
(74) *Attorney, Agent, or Firm* — Lando & Anastasi, LLP

(57) ABSTRACT

A heating and cooling system for an electric vehicle includes an electric pump that pumps fluid around a first loop to selectively cool part of the drive train of the vehicle. The fluid passes through a cabin heater that extracts heat energy from the fluid and back to the part of the drive train. An electric compressor pumps fluid around a second loop through a condenser which extracts heat energy from the fluid which flows through an expansion valve and an evaporator and back to the electric compressor. A cabin chiller including an evaporator is located in a flow path receiving fluid output from the condenser through an expansion valve upstream in the flow path. The fluid from the evaporator is drawn back into the second loop by the electric compressor.

(Continued)

The chilled fluid flowing through the evaporator extracts heat from the fluid flowing around the first loop.

17 Claims, 3 Drawing Sheets

(52) U.S. Cl.
CPC ......... *B60H 1/323* (2013.01); *B60H 1/32281* (2019.05); *B60H 2001/00307* (2013.01); *B60L 2270/46* (2013.01)

(58) Field of Classification Search
USPC ........................................................ 165/202
See application file for complete search history.

(56) References Cited

U.S. PATENT DOCUMENTS

| | | | | | |
|---|---|---|---|---|---|
| 8,773,058 | B2* | 7/2014 | Baglino | ................ | B60L 15/025 318/473 |
| 8,973,387 | B2* | 3/2015 | Osaka | ..................... | B60L 3/003 62/244 |
| 9,016,080 | B2* | 4/2015 | Brodie | ................ | H01M 10/663 62/239 |
| 9,067,476 | B2* | 6/2015 | Park | ........................ | F25B 13/00 |
| 9,205,739 | B2* | 12/2015 | Ekonen | ................ | B60K 17/344 |
| 9,217,594 | B2* | 12/2015 | Kawakami | ......... | B60H 1/00885 |
| 9,233,593 | B2* | 1/2016 | Beschieru | .......... | B60H 1/00885 |
| 9,440,512 | B2* | 9/2016 | Kim | ........................ | B60H 1/323 |
| 9,517,677 | B2* | 12/2016 | Tokuda | ................... | B60L 1/003 |
| 9,555,691 | B2* | 1/2017 | Tschismar | .......... | B60H 1/00278 |
| 9,561,704 | B2* | 2/2017 | Enomoto | ................ | F01P 7/165 |
| 9,631,872 | B2* | 4/2017 | Lombardo | .......... | B60H 1/00492 |
| 10,220,672 | B2* | 3/2019 | Yang | ....................... | B60H 1/143 |
| 10,259,291 | B2* | 4/2019 | Aldridge | .................. | B60K 1/00 |
| 10,290,911 | B2* | 5/2019 | Zhou | ................. | H01M 10/6569 |
| 10,297,881 | B2* | 5/2019 | Shen | ................... | H01M 10/443 |
| 10,315,519 | B2* | 6/2019 | Sakata | .................... | B60L 58/26 |
| 10,429,102 | B2* | 10/2019 | Radcliff | .............. | F25B 43/006 |
| 10,639,957 | B2* | 5/2020 | Koberstein | ........ | B60H 1/00428 |
| 10,654,336 | B2* | 5/2020 | Allgaeuer | ........... | H01M 10/625 |
| 10,773,586 | B2* | 9/2020 | Lucke | .................... | B60K 11/02 |
| 10,808,157 | B2* | 10/2020 | Rached | ............. | B60H 1/00907 |
| 2005/0022983 | A1* | 2/2005 | Kadle | ................ | B60H 1/00878 165/202 |
| 2005/0133215 | A1* | 6/2005 | Ziehr | ..................... | B60H 1/143 165/202 |
| 2009/0249807 | A1* | 10/2009 | Nemesh | ............. | B60H 1/00278 62/117 |
| 2009/0260377 | A1* | 10/2009 | Miller | ................ | B60H 1/00885 62/159 |
| 2010/0012295 | A1* | 1/2010 | Nemesh | .............. | H01M 10/663 165/104.19 |
| 2011/0289953 | A1* | 12/2011 | Alston | ..................... | B60H 1/32 62/238.6 |
| 2011/0296855 | A1* | 12/2011 | Johnston | ................ | B60K 11/02 62/79 |
| 2012/0205088 | A1* | 8/2012 | Morisita | .................. | B60H 1/20 165/202 |
| 2012/0297809 | A1* | 11/2012 | Carpenter | ............... | B60L 50/66 62/244 |
| 2013/0074525 | A1* | 3/2013 | Johnston | ............ | B60H 1/00385 62/56 |
| 2013/0175022 | A1* | 7/2013 | King | .................. | B60H 1/00392 165/202 |
| 2013/0255605 | A1* | 10/2013 | Jentz | ........................ | F01P 11/16 123/41.15 |
| 2013/0269911 | A1* | 10/2013 | Carpenter | .............. | B60H 1/143 165/104.13 |
| 2013/0298583 | A1* | 11/2013 | O'Donnell | ............. | B60H 1/143 62/115 |
| 2014/0014421 | A1* | 1/2014 | Carpenter | ............... | B60H 1/143 180/65.1 |
| 2014/0062228 | A1* | 3/2014 | Carpenter | ................ | H02K 9/24 310/53 |
| 2014/0096550 | A1* | 4/2014 | Gao | ........................ | B60L 1/003 62/115 |
| 2014/0144160 | A1* | 5/2014 | Jackson | ............... | H01M 10/625 62/62 |
| 2014/0182832 | A1* | 7/2014 | Styles | ................ | B60H 1/00278 165/202 |
| 2014/0208789 | A1* | 7/2014 | Lombardo | ......... | B60H 1/00278 62/238.6 |
| 2014/0326430 | A1* | 11/2014 | Carpenter | ................. | B60L 1/02 165/41 |
| 2015/0032318 | A1* | 1/2015 | Gao | .................... | B60H 1/00392 701/22 |
| 2015/0210141 | A1* | 7/2015 | Ragazzi | ............. | B60H 1/00907 62/93 |
| 2016/0107501 | A1* | 4/2016 | Johnston | ............ | B60H 1/00278 165/202 |
| 2016/0107503 | A1* | 4/2016 | Johnston | ............ | B60H 1/32284 165/202 |
| 2016/0107505 | A1* | 4/2016 | Johnston | ............ | B60H 1/00914 165/202 |

FOREIGN PATENT DOCUMENTS

| | | |
|---|---|---|
| WO | 2018069629 A1 | 4/2018 |
| WO | 2018/078379 A1 | 5/2018 |

OTHER PUBLICATIONS

Search Report under Section 17 from GB1618385.7, dated Nov. 24, 2016.
Communication pursuant to Article 94(3) EPC in European Patent Application No. 17792159.0 dated Apr. 8, 2020.

* cited by examiner

HEATING AND COOLING SYSTEM FOR AN ELECTRIC VEHICLE

CROSS-REFERENCE TO RELATED APPLICATIONS

This application is a U.S. national stage application and claims the benefit under 35 U.S.C. § 371 of PCT/GB2017/053239, titled A HEATING AND COOLING SYSTEM FOR AN ELECTRIC VEHICLE, filed Oct. 27, 2017, which claims priority to Great Britain Patent Application No. 1618385.7, filed Oct. 31, 2016, which patent applications are hereby incorporated herein by reference in their entireties for all purposes.

This invention relates to improvements in heating and cooling systems for electric vehicles.

Electric vehicles rely on electrical energy to drive one or more electric motors that propel the vehicle. The energy is typically supplied from a battery pack mounted to the vehicle. The vehicles are becoming increasingly viable as an alternative to vehicles propelled by an internal combustion engine due to advances in both battery technology and motor technology.

One of the key challenges in the design of an electric vehicle is to provide an acceptable range between recharges of the battery pack. Significant efforts have therefore been made to reduce the weight of the vehicles, such as the use of composite materials to provide a body in white that is lighter than a traditional steel body, and the miniaturization of the ancillary components on the vehicle.

Electric vehicles do not produce the large amounts of waste heat that internal combustion engine powered vehicles produce, which presents challenges to the designer where there is a need to fine control the temperature of the cabin. There is a challenging requirement to provide cooling of the drivetrain and in some cases heating. In particular, the battery cells in the battery pack must be kept within an optimal range of temperatures for best performance and for safety. At present, a dedicated self-contained cooling system is provided for the drivetrain of an electric vehicle, and a bespoke heating and cooling (HVAC) system needs to be provided which takes energy from the battery to provide heat using an electric heater.

The applicant has appreciated that improvements can be made to the conventional arrangements for heating and cooling of electric vehicles.

According to a first aspect the invention provides a heating and cooling system for an electric vehicle that comprises:

an electric pump that pumps fluid around a first loop to selectively cool a part of the drive train of the vehicle, the fluid then passing through a cabin heater that extracts heat energy from the fluid and then back to the part of the drive train, an electric compressor that pumps fluid around a second loop through a primary condenser which extracts heat energy from the fluid which then flows through a first expansion valve and through a primary evaporator and then back to the electric compressor, a cabin chiller comprising a secondary evaporator that is located in a flow path receiving fluid output from the primary condenser through a second expansion valve upstream in the flow path, the fluid that is output from the secondary evaporator being drawn back into the second loop by the electric compressor, and in which the chilled fluid flowing through the primary evaporator is arranged to extract heat from the fluid flowing around the first loop.

The present invention provides a combined heating and cooling system for both the cabin and drive train of an electric vehicle which is considerably simplified compared with the separate systems of the prior art. Waste heat from the drive train is used to heat the cabin and the chiller of the cooling system is used to provide the required cooling of the fluid that cools the drivetrain. This reduced complexity may allow the weight of the system to be reduced, a significant benefit for electric vehicles.

The primary evaporator may act upon fluid in a portion of the first loop that is located downstream of the primary heater and upstream of the part of the drive train that is heated or cooled by the fluid in the first loop.

A heat exchanger may be provided downstream of a part of the drivetrain that is cooled and upstream of the heater. This may be beneficial to prevent too much heat being fed to the cabin heater and to prevent the primary evaporator being supplied with fluid at too high a temperature. The heat exchanger may be located upstream of the pump. In a preferred arrangement, fluid used to cool an Electric motor and fluid used to cool and inverter, both of which operate with higher temperature, may pass through the heat exchanger whilst fluid from a part of the drive train that does not get as hot such as a battery pack may bypass the heat exchanger.

The heat exchanger may comprise a radiator that may be located behind the primary evaporator.

The first loop and second loop may be fluidically isolated from each other such that fluid in the first loop cannot contact fluid of the second loop. Only heat energy is transferred between the fluids in the two loops.

The system may include an arrangement of air ducts that receive inlet air and blow the air selectively across the cabin heater and cabin chiller before passing the air into the cabin of the vehicle.

The cabin chiller may be mounted before the heater to ensure air dehumidification in cold weather. In winter the air is first cooled to draw humidity from the air, than warmed again through the cabin heater and pushed to the cabin.

The system may include one or more control flaps, for instance within the ducts, that divert the air across the heater or chiller as required to control the cabin temperature. Two flaps may be provided.

A first flap may be operable to direct air that has passed across the cabin chiller into the cabin and not across the heater when in a first positon or across the heater and not into the cabin when in a second position, the flap having a range of blend positions between the first and second position in which chilled air is shared by the cabin and heater.

A second flap may be operable to direct air that has been heated by the heater into the cabin when in a first positon and not into the cabin when in a second position, the flap having a range of blend positions between the first and second position in which chilled air is partially fed into the cabin.

The first loop may be arranged such that fluid flowing around the loop flows through the heater at all times. There may therefore not be a bypass for the heater. In warm weather, when the cabin doesn't require to be heated, the cabin heater will continue to act to extract heat from the first circuit and with the second flap set to prevent this warm air entering the cabin it can be dumped to the air outside the cabin.

An electric blower may be provided that forces air through the ducts and across one or both of the heater and the chiller, the speed of the blower being controllable by the driver of the vehicle.

The cabin chiller and associated second expansion valve may be located in a flow path that is in parallel with the part of the second loop containing the first expansion valve and primary evaporator.

The first and second evaporators may be controllable to regulate the mass flow of fluid around the second loop and the flow path containing the cabin chiller. This allows the amount of cooling provided by the cabin chiller relative to the amount of cooling provided by the primary evaporator to be regulated. For instance in extreme hot conditions where the drivetrain is also under sustained high load, the fluid may all be fed to the primary evaporator to assist in cooling the fluid in the first circuit at the expense of reduced cooling of the cabin by cutting off the flow to the cabin chiller.

The expansion valves may therefore by selectively opened and closed.

The part of the drivetrain that is cooled by the fluid in the first loop may comprise one or more, or all of the following parts: the electric propulsion motor or multiple propulsion motors of the vehicle, the inverter that connects the energy supply to the motor or multiple motors, and the energy store. The energy store may comprise a battery pack of battery cells.

To cool the part of the drivetrain the system may include a network of conduits that pass through the part to be cooled or surround the part to be cooled, preferably in direct contact to allow heat to be transferred into the fluid in the first loop by conduction. In the case of a battery pack, the fluid may pass along a network of conduits that pass between the cells within the battery pack.

Each part of the drivetrain that is cooled may be selectively connected to the first loop through a valve that can be opened and closed or partially opened to control the mass flow of fluid. When closed the part may be isolated from the first loop so that it is not cooled. This allows the different temperature requirements of each part of the drive train to be controlled. The energy store, for example, must be maintained within a smaller range of temperatures than the electric motor.

The apparatus may include a microcontroller that is adapted to receive a temperature signal indicative of the temperature of each part of the drivetrain which is associated with a valve and to open and close the valve dependent on the temperature. For example in cold weather all three valves are shut. With no circulation of fluid electric motor will be quickly warmed up. The valves will open as soon they reach the operating temperature.

In a most preferred control strategy where the drivetrain includes a motor, and inverter and a battery pack the microcontroller may initially close all the valves and open the valves for the motor and inverter once they reach a predefined operating temperature, the valves thereafter being modulated to maintain the temperature in a predefined range. Then the hot fluid will be send directly to the battery pack by the microcontroller opening the valve for the battery pack.

The fluid for the second loop may comprise any suitable coolant that has a dielectric property, meaning it will readily undergo a phase change from liquid to gas at useful temperatures. An exemplary coolant that may be used in an electric vehicle is the haloalkane 1,1,1,2-tetrafluoroethane.

The fluid for the first loop can be any liquid such as a mix of water and an additive that lowers the freezing point of the mixture such as glycol. In the first loop the fluid will remain in a liquid phase for all the time during use. It could be a simple water-glycol solution or, for safety reasons, is better to use dielectric oil (with a slightly less cooling performance compared to the water-glycol fluid).

The microprocessor may additionally receive input signals associated with the drive train including the instant or average current draw of the motor, inverter or battery and the instant or predicted current demand. The accelerator and/or brake pedal position may be input to the microprocessor, where the former may indicated a high predicted and the later and high flow of current back into the battery under regenerative braking.

According to a second aspect the invention provides an electric vehicle which includes a system according to the first aspect, comprising: A drivetrain that includes at least one electric motor, an energy store and an inverter that connects the motor to the energy store, and A cabin for passengers, In which the cabin heater and the cabin chiller are arranged to provide heating and cooling of the cabin.

The primary condenser may be located in a region of the vehicle that is in the flow of air created as the vehicle moves, for instance at the front of the vehicle behind a grille. It can, of course, be located in a range of positions where ducting from outside of the vehicle can force air across the primary condenser.

There will now be described by way of example only one embodiment of the present invention of which:

Figure 1:
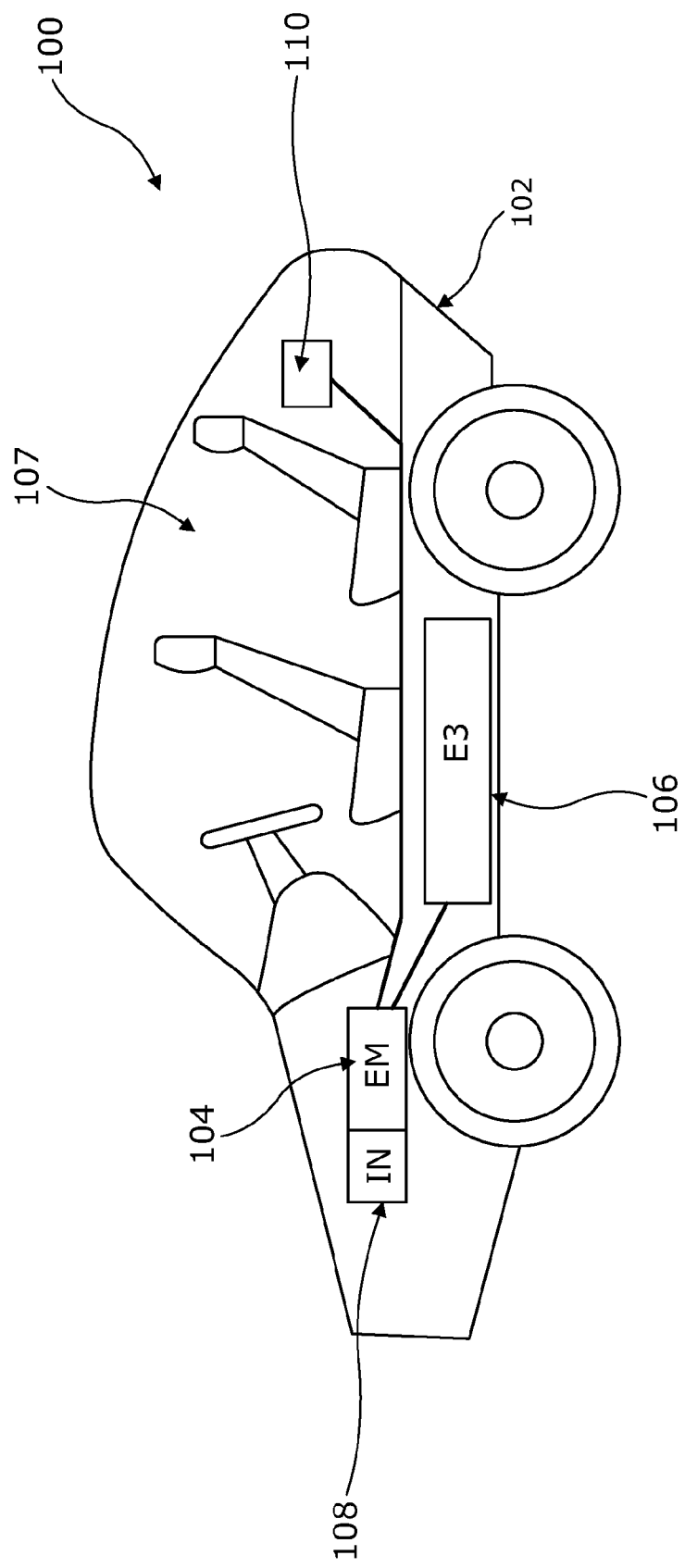
FIG. 1 shows an exemplary electric vehicle which may include the heating and cooling system of the present invention.

As shown in FIG. 1, an electric passenger vehicle 100 comprises a monocoque chassis 102 that provides the mounting point for a suspension and a vehicle drivetrain. As shown the drivetrain comprises a single electric motor 104 located at the front of the vehicle in an engine compartment, and a battery pack 106 that is located under the floor of the cabin 107 to provide a low centre of gravity. The battery 106 is connected to the motor 104 through an inverter 108. A charging connector 110 enables an external supply of electricity to the battery pack 106. Of course the reader will understand that this arrangement can be varied and layout of the electric vehicle shown is not intended to limit the scope of protection. A ladder chassis with separate cabin may be provided instead of a monocoque, the battery pack may be located in an alternative region of the vehicle and rather than one motor as shown a number of electric motors may be provided. These may also be located in different regions of the vehicle, perhaps at the rear of the vehicle rather than at the front, or within the hub of one or more of the wheels of the vehicle.

Figure 2:
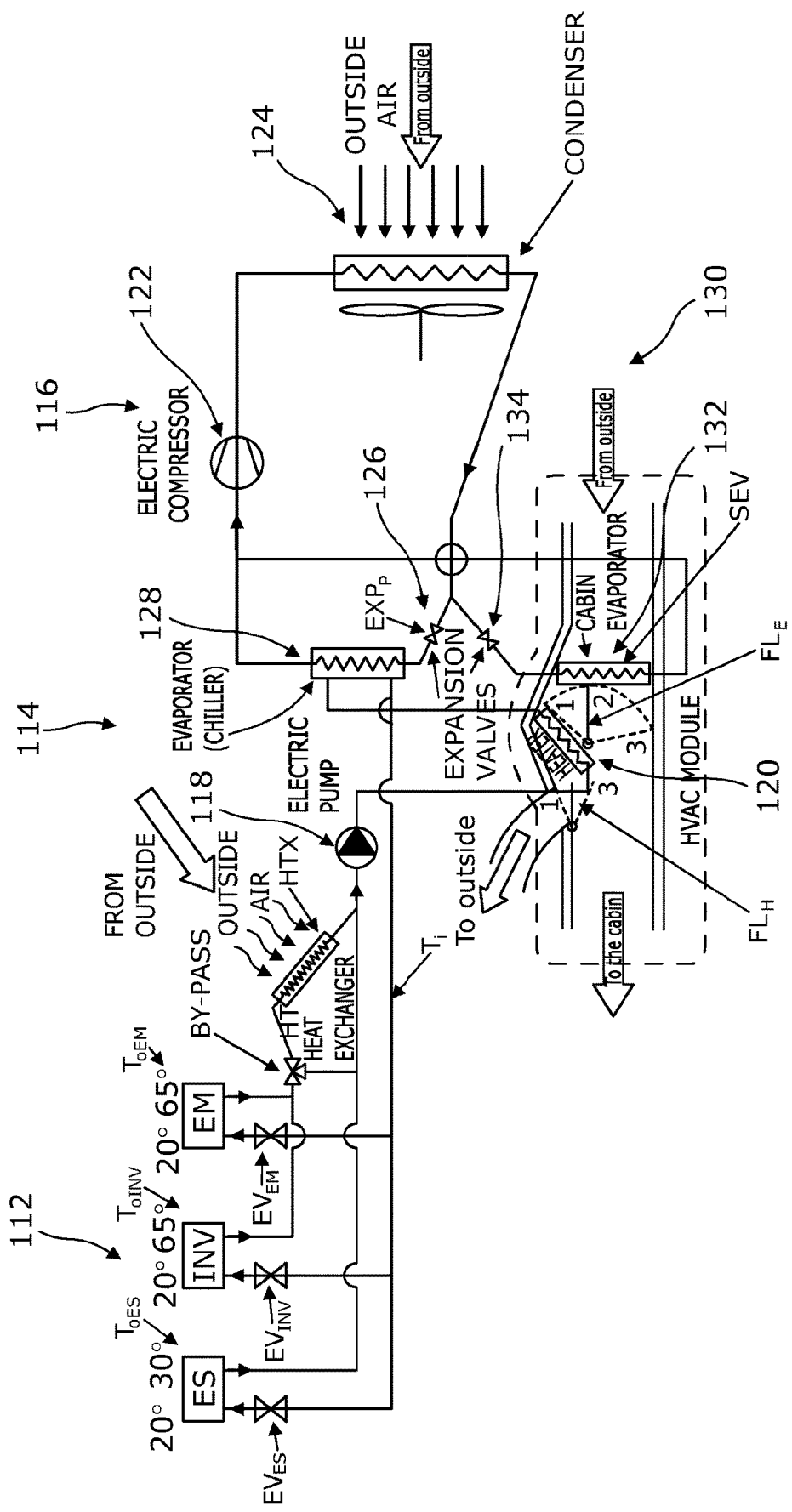
FIG. 2 is a circuit diagram showing an exemplary heating and cooling system in accordance with an aspect of the invention.

FIG. 2 shows schematically an embodiment of a heating and cooling circuit 112 of the present invention that may be fitted to the vehicle of FIG. 1 or a similar vehicle.

The heating and cooling system comprises a number of key components connected by conduits that primarily function to heat fluid, to cool fluid, and to circulate the fluid around the vehicle and to manage the flow of heated or cooled air provided by the system. The system is arranged as two closed loops 114, 116 around which the fluid is pumped.

These loops 114, 116 provide heating and cooling for the drivetrain and also for the control of the temperature of the air in the vehicle cabin 107.

A first loop 114 provides the primary means for extracting heat energy from the drive train when it needs to be cooled or applying heat energy to the drive train when it needs to be heated. The fluid in this first loop is in liquid form at all times and can provide heating of the battery pack 106 by sending warm fluid from the inverter and motors directly to the battery pack as soon as it becomes to be available. This loop 114 includes an electric pump 118 that pumps fluid around the drive train of the vehicle, the fluid then passing through a cabin heater 120 that extracts heat energy from the fluid and then back to the part of the drive train.

A second loop 116 includes an electric compressor 122 that pumps fluid around the second loop 116 through a primary condenser 124 which extracts heat energy from the fluid which then flows through a first expansion valve 126 and through a primary evaporator 128 and then back to the electric compressor 122. The primary function of this loop 116 is to extract heat energy from the fluid flowing around the second loop 116 so that the chilled fluid can be used to provide both cabin cooling as will be explained and be used to extract heat energy from the first loop 114. In use, the fluid will be in a heated liquid form when flowing through the condenser 124, and in gaseous form as it is sucked out of the evaporator 128 by the compressor 122. The expansion that occurs in the expansion valve 126 lowers the temperature of the fluid as it is fed into the evaporator, and as the fluid passes through the evaporator 128 the heat around the evaporator 128 causes the fluid in the second loop to boil off as a gas. The heat is provided by the first fluid as it flows through the evaporator, isolated at all times from the fluid in the second loop.

A third loop 130 is provided for the purpose of chilling the cabin 107. This loop 130 includes a cabin chiller comprising a secondary evaporator 132 that selectively receives the liquid output from the primary condenser 124 through a second expansion valve 134 that chills the liquid, the gas that is output from the secondary evaporator 132 being sucked back into the second loop 116 by the electric compressor 122. As shown the output of the cabin chiller 132 feeds into the second loop 116 at the inlet to the compressor 122, placing the first expansion valve 126/evaporator 128 and the second expansion valve 134/cabin chiller 132 in parallel with each other. The cabin chiller 132 removes energy from air passing across it before the cooled air is fed to the cabin.

To extract heat energy from the first loop 114, the fluid from the first loop 114 passes through the primary evaporator 128. The primary evaporator 128 therefore draws energy from the fluid in the first loop 114.

The first and second expansion valves 126, 134 are controlled by a controller or microprocessor 136 that receives input signals from temperature sensors associated with the drive train and other demand signals, for example based on the current demanded by the motor, the external temperature, cabin temperature and common Inlet Temperature for the powertrain ($T_i$) The controller 136 therefore ensures the optimal cooling and heating of the drivetrain.

Figure 3:
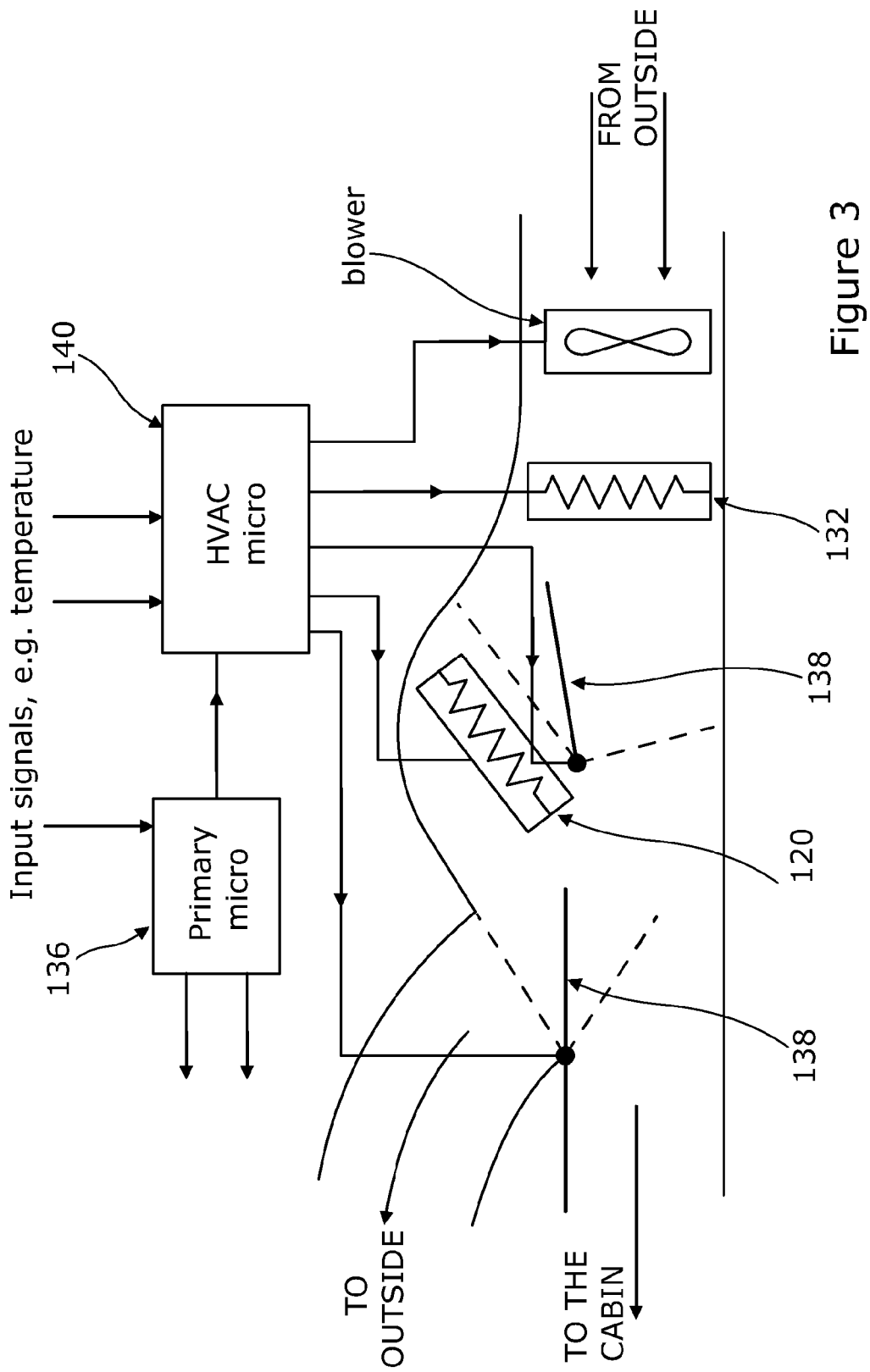
FIG. 3 is a system diagram of the interactions between the air ducts and the heating and cooling components, in accordance with FIG. 2.

The system further includes an arrangement of air ducts that receive inlet air and blow the air selectively across the cabin heater 120 and cabin chiller 132 before passing the air into the cabin of the vehicle. This is shown in FIG. 3 of the drawings. The ducts may include one or more control flaps 138 (see $FL_H$ and $FL_E$) that divert the air across the heater 120 or chiller 132 as required to control the cabin temperature and the powertrain. The position of the control flaps 138 may be set by the driver, for instance under control of a heating and cooling (HVAC) controller 140 that receives signals from a user controlled interface located in the cabin 107. The skilled reader will be familiar with the design and implantation of a suitable arrangement of ducts, flaps and microcontroller to ensure the optimal regulation of the temperature of the cabin using the heated and cooled air supplied from the cabin heater and cabin chiller.

The operation of the exemplary system at different drive train temperatures is as follows:

Extreme Cold Weather Operation (for Example −20° C. or Below):

The microprocessor closes the valves so that the fluid flows around the first loop 114 but not through the Inverter and Motor when doing the first miles. Evaporator Flap $FL_E$ and Heater Flap $FL_H$ are both in position 1. Expansion valve of the primary evaporator EXP is closed as well. As soon as the fluid starts to flow, it will go almost entirely to the battery pack with little dispersion along the circuit, avoiding the complexity of bypass valves. Then the Evaporator Flap $FL_E$ can slowly change the position to 2 and 3 and send additional heating to the cabin as the powertrain warming up. During this time the fluid flows around the second loop 116 where it is compressed to form a heated liquid that passes through the condenser 124 before being expanded back to a gas at a lower temperature that is fed to the primary evaporator 128. At this low temperature of the drive train it is unlikely that cabin chilling will be needed so the second expansion valve 134 may be closed to cut off the third loop 130 including the cabin chiller 132. The flow of fluid will be managed by the microprocessor taking inputs such as cabin humidity and cabin temperature. This allows the drive train to heat up as quickly as possible with no cooling.

Moderate Cold Weather Operation for Example 0° C. Down to −20 Degrees:

At this temperature the drive train parts will heat rapidly and the fluid in the first loop 114 is passed through the cabin heater 120 as the main structure for providing cooling of the fluid. The Primary Evaporator may be used but as the last resort, because is energy consuming to use the fluid in the second loop to cool the fluid in the first loop. At this weather condition the first loop can freely exchange heat with the environment through the High temperature heat Exchanger (HTX) at no extra (energy) costs. The valves feeding the parts of the motor are modulated by the microprocessor to control the mass flow rate to ensure that the amount of cooling is optimized.

In particular, the modulation of the valves will in use keep the three main components (battery pack, inverter and motor) at the maximum temperature allowed, as this is the condition where the entire system has the less workload in terms of removing energy.

Moderate Warm Weather Operation (for Example+20° C. or Higher):

In this condition fluid in the first loop from inverter and motor will pass through High temperature heat Exchanger (HTX) then through heater with the two flaps regulated by the microprocessor but, for example, likely to be $FL_H$ in position 3 diverting heat toward outside through the duct rather than inside the cabin and $FL_E$ in position 2. Air conditioning for the cabin could or could not operate depending on driver request. If there is any remaining heat from first loop to be removed this heat will be removed by the cooled fluid in the second loop as the fluid of the first loop passes through the primary evaporator (PEV,128). The valve opening percentage of the Expansion valve ($EXP_P$) for the primary evaporator may be driven by an Inlet Temperature sensor ($T_i$) that measures the temperature of fluid flowing back to the drivetrain and will allow the minimum flow possible from the second loop to maintain that target temperature.

Extreme Hot Weather

At extremely high temperatures the circuit functions much the same as it does for moderate warm weather but in addition the Evaporator Flap $FL_E$ can be (temporary) moved up to position 3 if all the other heat exchanger systems (HTX, PEV, and cabin heater with Heater Flap $FL_H$ in position 3) are at the maximum power, to give some additional cooling at the expense of allowing the cabin to become hot.

The invention claimed is:

1. A heating and cooling system for an electric vehicle comprising:
   an electric pump configured to pump fluid around a first loop to selectively cool a plurality of parts of a drive train of the electric vehicle, the fluid then passing through a cabin heater configured to extract heat energy from the fluid and then back to the plurality of parts of the drive train,
   an electric compressor configured to pump fluid around a second loop through a primary condenser configured to extract heat energy from the fluid to generate a chilled fluid which then flows through a first expansion valve and through a primary evaporator and then back to the electric compressor, and
   a cabin chiller comprising a secondary evaporator located in a flow path receiving fluid output from the primary condenser through a second expansion valve upstream in the flow path, the fluid that is output from the secondary evaporator being drawn back into the second loop by the electric compressor,
   wherein the chilled fluid flowing through the primary evaporator is arranged to extract heat from the fluid flowing around the first loop,
   the plurality of parts of the drive train comprising at least two of an electric propulsion motor, an energy store, and an inverter connecting the motor to the energy store, and further comprising a plurality of valves arranged in parallel so that each part of the drive train that is cooled may be selectively connected to the first loop through a respective valve that can be opened and closed or partially opened to selectively cool any of the plurality of parts of the drive train at a given time, and
   wherein the fluid is only able to circulate around the first loop by passing through the cabin heater.

2. The heating and cooling system according to claim 1 wherein the primary evaporator is configured to act upon the fluid in a portion of the first loop that is located downstream of the cabin heater and upstream of the part of the drive train that is heated or cooled by the fluid in the first loop.

3. The heating and cooling system according to claim 1 further including a heat exchanger downstream of the part of the drive train that is cooled and upstream of the cabin heater.

4. The heating and cooling system according to claim 3 wherein the heat exchanger comprises a radiator located behind the primary evaporator such that the radiator is configured to receive air that has passed over the primary evaporator.

5. The heating and cooling system according to claim 1 wherein the first loop and the second loop are fluidically isolated from each other such that the fluid in the first loop cannot contact the fluid of the second loop.

6. The heating and cooling system according to claim 1 further including an arrangement of air ducts configured to receive inlet air and blow the air selectively across the cabin heater and the cabin chiller before passing the air into a cabin of the vehicle.

7. The heating and cooling system according to claim 6 wherein the cabin chiller is mounted upstream of the cabin heater to ensure air dehumidification in cold weather, such that in the cold weather the air is first cooled to draw humidity, than warmed again through the cabin heater and pushed to the cabin.

8. The heating and cooling system according to claim 7 further including one or more control flaps configured to divert the air across the cabin heater or the cabin chiller as required to control cabin temperature.

9. The heating and cooling system according to claim 8 wherein a first flap is operable to direct air that has passed across the cabin chiller into the cabin and not across the cabin heater when in a first position or across the cabin heater and not into the cabin when in a second position, the flap having a range of blend positions between the first and the second position in which chilled air is shared by the cabin and the cabin heater.

10. The heating and cooling system according to claim 8 wherein a second flap is operable to direct air that has been heated by the cabin heater into the cabin when in a first position and not into the cabin when in a second position, the flap having a range of blend positions between the first and the second position in which chilled air is partially fed into the cabin.

11. The heating and cooling system according to claim 1 wherein the cabin chiller and the second expansion valve are located in a flow path in parallel with a part of the second loop containing the first expansion valve and the primary evaporator.

12. The heating and cooling system according to claim 1 wherein the first and the second evaporators are controllable to regulate mass flow of the fluid around the second loop and the flow path containing the cabin chiller.

13. The heating and cooling system according to claim 1 including a microcontroller adapted to receive a temperature signal indicative of a temperature of each of the parts of the drive train which are associated with a respective valve and to open and close the valve dependent on the temperature.

14. The heating and cooling system according to claim 13 wherein the drive train includes a motor, an inverter and a battery pack and the microcontroller is configured to implement a control strategy in which the microcontroller initially closes all the valves and opens the valves for the motor and the inverter once they reach a predefined operating temperature, the valves thereafter being modulated to maintain the temperature in a predefined range.

15. The heating and cooling system according to claim 1 wherein the fluid for the second loop comprises a coolant that has a dielectric property, the coolant being configured to readily undergo a phase change from liquid to gas at useful temperatures.

16. The heating and cooling system according to claim 1 wherein the fluid for the first loop comprises a liquid such as a mixture of water and an additive selected to lower a freezing point of the mixture.

17. An electric vehicle including the heating and cooling system according to claim 1, the electric vehicle comprising:
   the plurality of parts of the drive train, and
   a cabin for passengers, wherein the cabin heater and the cabin chiller are arranged to provide heating and cooling of the cabin.

* * * * *